United States Patent

Rogers

[11] Patent Number: 5,430,927
[45] Date of Patent: Jul. 11, 1995

[54] DOUBLE WALLED TANK AND METHOD OF MAKING THE SAME

[75] Inventor: William K. Rogers, Lincoln, Nebr.

[73] Assignee: Snyder Industries, Inc., Lincoln, Nebr.

[21] Appl. No.: 159,849

[22] Filed: Dec. 1, 1993

Related U.S. Application Data

[62] Division of Ser. No. 88,196, Jul. 6, 1993.

[51] Int. Cl.6 .............................................. B23P 11/02
[52] U.S. Cl. ...................................... 29/447; 264/229
[58] Field of Search ................ 29/447, 455.1; 264/229

[56] References Cited

U.S. PATENT DOCUMENTS

| | | | |
|---|---|---|---|
| 1,911,430 | 5/1933 | Cautley | 29/447 X |
| 1,998,356 | 4/1935 | Brown | 29/447 X |
| 2,401,231 | 5/1946 | Crawford | 29/447 X |
| 2,609,595 | 9/1952 | Rossheim | 29/447 X |
| 3,064,344 | 11/1962 | Arne | 29/447 X |
| 4,190,160 | 2/1980 | Anderson et al. | |
| 4,242,884 | 1/1981 | Kotschwar | |
| 4,727,641 | 3/1988 | Kanatani et al. | 29/447 |
| 4,793,491 | 12/1988 | Wolf et al. | |
| 4,949,833 | 7/1990 | Thomas | |
| 5,054,645 | 10/1991 | Sharp | |
| 5,060,817 | 12/1991 | Trussler | |

FOREIGN PATENT DOCUMENTS 402448  5/1974  U.S.S.R. ................. 29/447

Primary Examiner—Joseph M. Gorski
Attorney, Agent, or Firm—Hovey, Williams Timmons & Collins

[57] ABSTRACT

A method of constructing a double-walled tank includes forming the two containers, and removing the top of the containment shell and filling it with hot water so that the containment shell expands temporarily increasing the diameter of the side wall of the containment shell. The primary container is positioned in alignment over the containment shell and is lowered into contact with the hot water, and is filled with cold water of a temperature at least about 70° F. less than the temperature of the hot water so that the primary container contracts temporarily decreasing the diameter of the side wall of the primary container, and allowing the primary container to sink into the containment shell while displacing the hot water from the containment shell until the primary container is resting on the bottom of the containment shell.

18 Claims, 2 Drawing Sheets

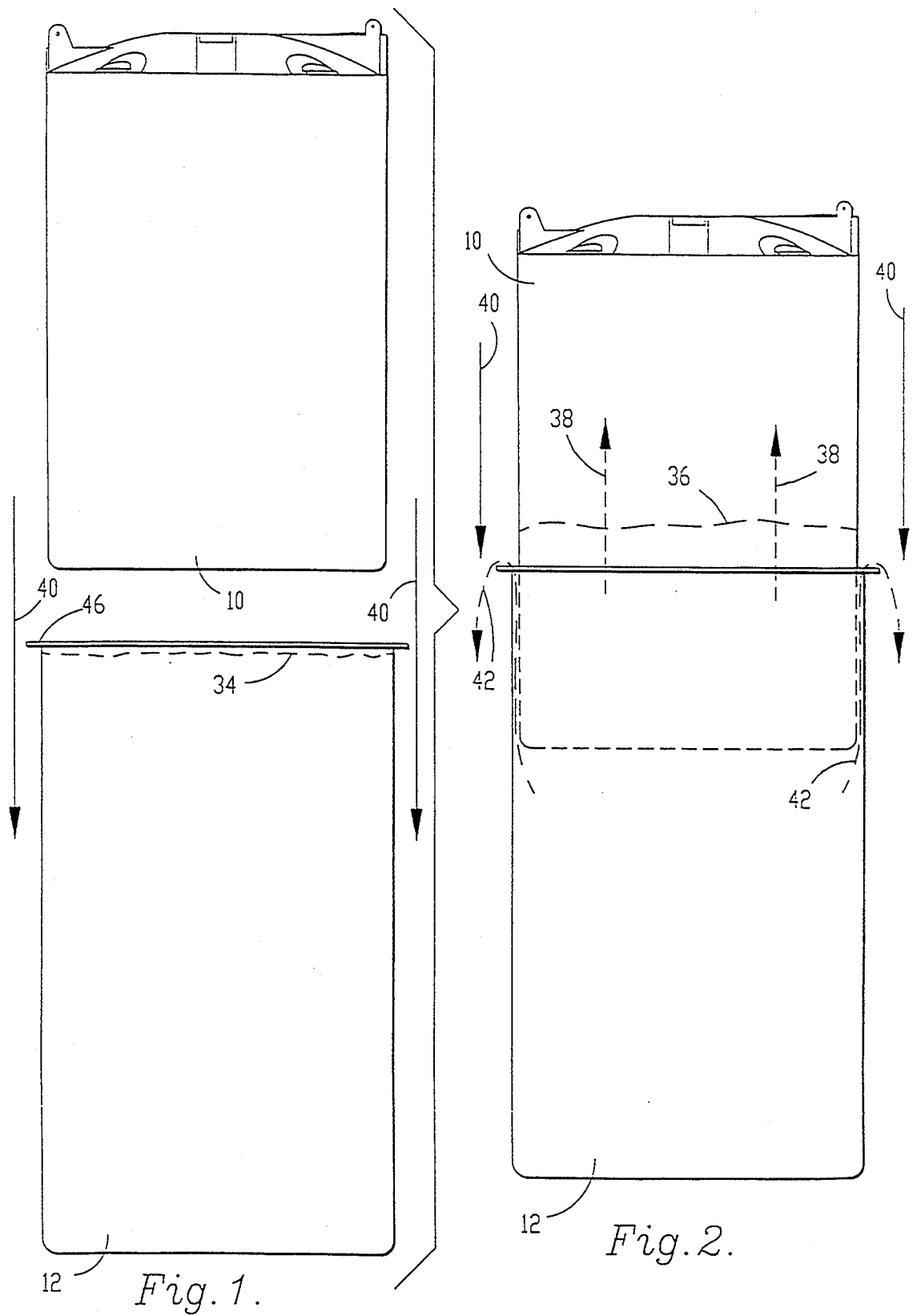

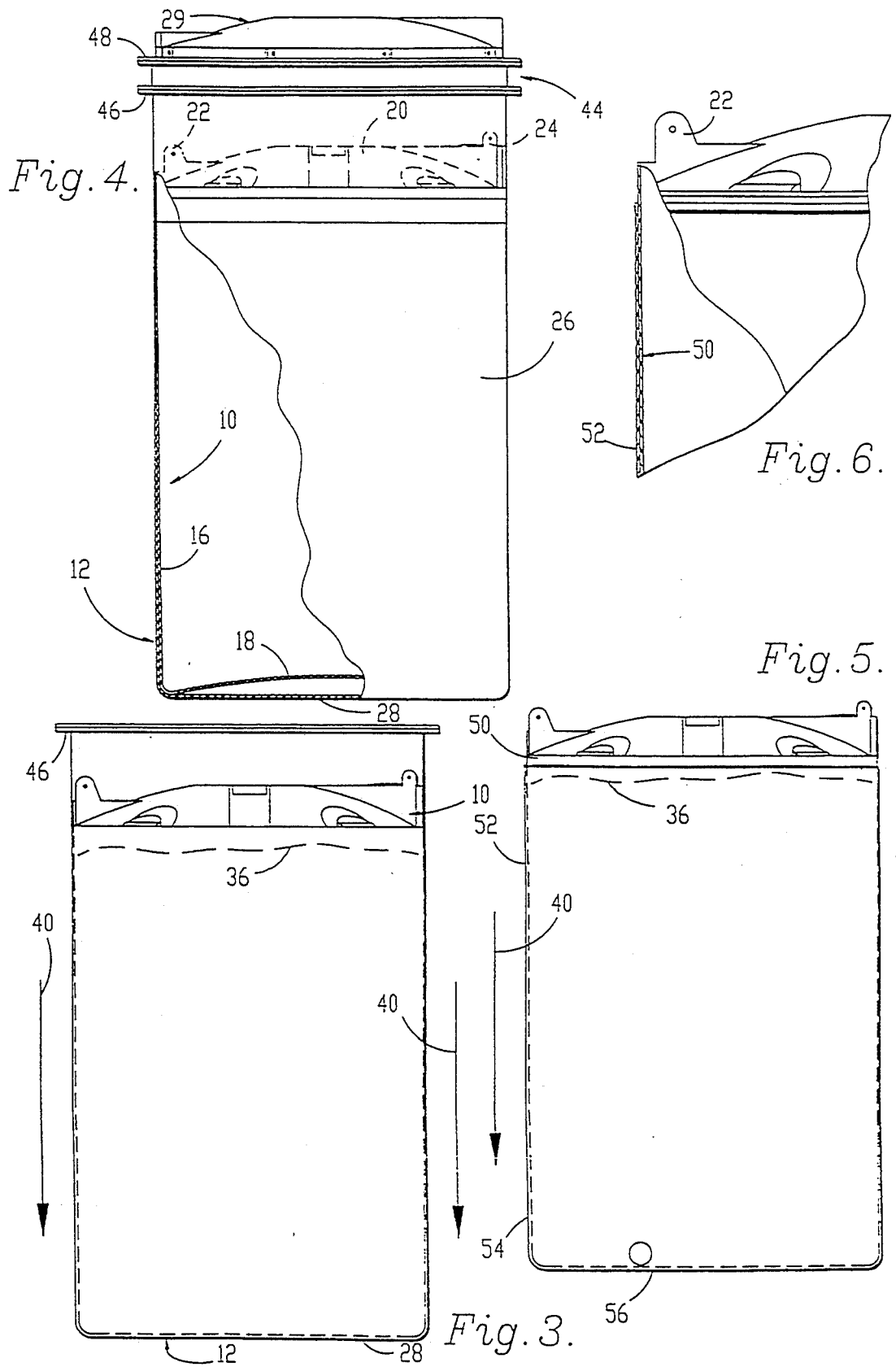

DOUBLE WALLED TANK AND METHOD OF MAKING THE SAME

This application is a divisional of application Ser. No. 08/088,196, filed Jul. 6, 1993.

BACKGROUND OF THE INVENTION

1. Field of the Invention

The present invention relates generally to containers for storing liquids and, more particularly, to a double walled tank and a method of constructing the same.

2. Discussion of the Prior Art

It is known to form a single-walled tank out of polyolefin or other suitable plastic material, for use in storing agricultural and industrial chemicals. These tanks are commonly formed by any of a number of different molding processes, such as rotation molding or the like.

Where these conventional containers are used to store chemicals which are potentially harmful to the environment, federal regulations require the use of an accompanying containment system for ensuring that any chemicals leaking or otherwise released from the tank are prevented from escaping the system. In this manner, it is possible to clean up after leaks and spills and to dispose of waste chemicals in a safe and proper manner.

A number of problems are presented to the use of these conventional tanks and containment systems. For example, a single walled container experiences both mechanical stress due to the outward pressure exerted on the tank by the chemicals contained therein, and chemical attack on the material used to form the container. Because the adverse effects of the chemical attack on the tank material are accelerated when the material is under mechanical stress, the useful life of a single walled container is severely limited.

Also, because the tank is formed with only a single wall, it does not provide full containment of the chemicals stored therein, but must be used in connection with a further containment system. Because conventional containment systems do not allow for the recapture and re-use of contaminated chemicals that leak from the tank, quantities of chemicals must be disposed of after a leak has occurred.

Attempts have been made to form a tank with a double-thickness wall by forming an interior wall within a pre-molded tank in an effort to build up the strength of the tank. However, this technique has proven unsatisfactory because in order to adequately cure the inner wall it is difficult not to over cure the previously formed outer wall.

OBJECTS AND SUMMARY OF THE INVENTION

It is an object of the present invention to provide a double-walled tank which stands up favorably to the mechanical loads and environmental stresses experienced in the storage of agricultural and industrial chemicals and the like, and which provides a longer useful life than conventional single-walled tanks.

It is another object of the present invention to provide a tank presenting a domed inner bottom wall surface which permits substantially complete emptying of the tank. Further, it is an object of the invention to provide a tank capable of fully containing the stored liquid in order to prevent leaking chemicals from escaping to the environment and from being contaminated themselves.

Yet another object of the present invention is to provide a method of constructing a double walled tank, which enables the tank to reduce or eliminate mechanical stresses within the inner container in order to reduce the adverse effects of environmental stresses imposed on the inner container by chemicals stored in the tank.

In accordance with these and other objects evident from the description of a preferred embodiment, the invention is drawn to a double-walled tank having a primary container and a separate, independent containment shell. The primary container includes top and bottom walls, and a tubular side wall, and the containment shell includes a bottom wall and a tubular side wall. The side wall of the containment shell is sized to impart to the side wall of the primary container a mechanical load in the inward radial direction when the primary container is positioned in the containment shell with the bottom wall of the primary container resting against the bottom wall of the containment shell.

By this construction, numerous advantages are realized. For example, by prestressing the side wall of the primary container in the inward radial direction, a counteracting radial force is presented in opposition to the outward pressure imposed by the weight of the liquid stored in the tank. Thus, the primary container remains substantially unloaded, providing improved resistance to chemical attack.

Another advantage obtained through the use of the present invention results from the effect prestressing has on the bottom wall of the primary container. Specifically, because of the inward radial force acting on the primary container, the bottom wall is biased toward a domed position, and is moved toward this position as the tank is emptied. Thus, the domed bottom wall directs the last quantity of liquid to the outer circumferential edge of the tank bottom so that the tank may be substantially completely emptied, either through an outlet provided in the side wall of the tank adjacent the bottom wall or through a hose extending into the tank from above and resting on the bottom wall.

A method of constructing the double-walled tank comprises the steps of forming two separate, independent containers, one of which is to be the primary container and the other of which is to be a containment shell. The side walls of the primary container and containment shell are tubular, being of the same diameter as one another. The top of the containment shell is removed and hot water is pumped into the containment shell so that the containment shell expands temporarily increasing the diameter of the side wall thereof. The primary container is positioned in alignment over the containment shell and is lowered into contact with the hot water.

Cold water is pumped into the primary container so that the primary container contracts temporarily decreasing the diameter of the side wall of the primary container, and allowing the primary container to sink into the containment shell while displacing the hot water from the containment shell until the primary container is resting on the bottom of the containment shell. Thereafter, the water is removed from the primary container to complete the tank.

By employing this method, numerous advantages are achieved. For example, by providing separate containers having side walls of the same diameter, and by inserting the primary container into the containment shell in accordance with the method, a double-walled tank results in which the side walls of the primary container are prestressed by an inward radial force exerted by the containment shell. This prestress force both counteracts the load exerted on the primary container by outward directed pressure from the liquid being stored, and biases the bottom of the primary container upward so that a dome is presented as the tank is emptied.

BRIEF DESCRIPTION OF THE DRAWING FIGURES

A preferred embodiment of the present invention is described in detail below with reference to the attached drawing figures, wherein:

FIG. 1 is a side elevational view of the components making up a double-walled tank constructed in accordance with a preferred embodiment of the present invention;

FIG. 2 is a side elevational view of the tank, illustrating a first subsequent stage of the assembly process;

FIG. 3 is a side elevational view of the tank, illustrating a second subsequent stage of the assembly process;

FIG. 4 is a side elevational view of the resulting double-walled tank;

FIG. 5 is a side elevational view of an alternate construction of a double-walled tank constructed in accordance with the present invention; and FIG. 6 is a fragmentary side elevational view of the tank shown in FIG. 5.

DETAILED DESCRIPTION OF THE PREFERRED EMBODIMENT

A double-walled tank constructed in accordance with a preferred embodiment of the present invention is illustrated in FIG. 5, and broadly includes a primary container 10 and a containment shell 12.

The primary container 10 is of a hollow cylindrical shape, having a tubular side wall 16 extending between a planer, circular bottom wall 18 and a domed circular top wall 20. The container is preferably formed of polyolefin by a rotation molding technique, and has a wall thickness ranging between less than 0.5 inches to greater than 1.5 inches, and preferably between 0.75 inches and 1.25 inches.

The side wall 16 may be formed of any desired height ranging between less than 4-6 feet to greater than 26 feet, so that a large range of tank sizes are available. Further, although the side wall is illustrated as being completely uninterrupted, it is possible to form an outlet fitting in the sidewall adjacent the bottom wall for permitting liquid to be removed from the container. The side wall 16 is connected to the bottom wall 18 around the circumferential edge of the bottom wall, and the corner between the side and bottom walls is radiused.

The top wall 20 may be formed of any desired configuration, but preferably is domed, having one or more axially extending openings formed therein. On diametrically opposed sides of the top wall, pairs of spaced ears 22, 24 are provided, each pair of which are formed with transverse holes extending therethrough. These ear pairs 22, 24 permit a ladder to be attached to the tank for allowing maintenance personnel to climb onto the tank, and present points by which the tank maybe lifted, e.g. by a crane or the like.

The containment shell 12 is also formed of polyolefin and includes a side wall 26 which is taller than the side wall 16 of the primary container, and a bottom wall 28 of identical dimensions to those of the bottom wall 18 of container 10. The containment shell also includes a top wall 29 which may be formed of any desired configuration, e.g. of a domed shape having one or more axially extending openings formed therein.

Preferably, the containment shell is formed in a mold substantially identical to the mold used to form the primary container, except that the top end of the mold is replaced by a different mold top which extends the height of the side walls of the containment shell beyond the height of the side walls of the primary container. Thus, a containment shell results which includes a side wall having the same diameter as the side wall 16 of the primary container, but which is of a greater height than the primary container such that when the primary container is positioned within the containment shell, a headway is formed between the top wall of the primary container and the top of the containment shell.

After formation of the containment shell 12, the top wall thereof is removed, e.g. by cutting, sawing or the like, such that the containment shell presents a completely open upper end for receiving the primary container 10.

A vapor-tight seal is provided between the side and top walls 26, 29 of the containment shell in order to present a full containment system when assembled. This seal includes a channel-shaped collar 44 attached between an upper flange 46 of the side wall 26 and a lower flange 48 of the top wall 29. Suitable gaskets are fitted between the collar and each of the flanges, and the collar is secured in place by conventional fasteners.

Preferably, the collar is formed of a corrosion resistant metal of a strength sufficient to support additional hardware, such as a ladder extending outside the containment shell 12 to the ground, or a platform within the shell for supporting a pump or the like.

A preferred method of constructing the double-walled tank of the present invention is illustrated in FIGS. 1-4. Turning first to FIG. 1, the method includes the initial step of forming the two containers 10, 12. Thereafter, the top 29 of the containment shell is removed and the primary container is lifted over the containment shell.

Preferably, the primary container 10 is hung from a vertically extendable boom and is supported by a strap wrapped around the middle of the container and connected to the boom. The tension of the strap may be adjusted to enable the grip on the primary container to be loosened or tightened during assembly. In addition, suitable controls are provided for allowing the boom to be raised and lowered in order to lift the primary container above the containment shell and to guide lowering of the container during the assembly process.

Preferably, once the primary container 10 is lifted to a raised position over a platform, the containment shell 12 is positioned on the platform and filled to the level indicated by the dashed lines 34 in FIG. 1, with hot water having a temperature ranging between about 112° to 150° F. so that the containment shell expands, temporarily increasing the diameter of the side wall of the containment shell. Although it may be possible to employ water of a temperature less than 112° F., it is important not to exceed 150° F. where polyolefin is used in order to avoid softening of the material.

Preferably, the hot water is stored in an insulated reservoir or water heater prior to being pumped into the containment shell by a high capacity pump which delivers the water through a large hose that is supported by an independent boom above the containment shell and that is movable into and out of a position directed into the containment shell. The total time required for filling the containment shell should be as short as possible in order to preserve the temperature of the hot water during assembly of the double-walled tank. For example, the pump used is preferably large enough to fill a 22,000 gallon containment shell in under 15 minutes.

Once the containment shell 12 is full of hot water, the hot water hose is swung away from the containment shell and the primary container 10 is lowered into contact with the hot water. Guides may be placed around the upper circumferential edge of the containment shell to align the primary container with the shell during this movement. Although not shown, these guides preferably include a small ramp extending above and beyond the side wall of the containment shell and angled inward so that the primary container slides along the ramp into the containment shell.

Thereafter, the primary container 10 is quickly filled with cold water of a temperature at least about 70° F. less than the temperature of the hot water so that the primary container contracts temporarily decreasing the diameter of the side wall of the primary container. The preferred difference in temperature between the hot and cold water is 80° F. If the difference is too small, it is difficult for the primary container to slide within the containment shell during assembly.

Preferably, a high capacity pump is provided for pumping cold water from a storage reservoir into the primary container. An inverted, U-shaped pipe is suspended from a boom, and one end of the pipe is connected to the pump while the other end of the pipe extends into the primary container so that water discharged into the container is discharged adjacent the bottom wall thereof to maintain the desired difference in temperature between the walls of the primary container and the walls of the containment shell. By reversing the pump relative to the lines extending from the pump to the reservoir and the U-shaped pipe, the pump may also be used to remove the cold water from the primary container at the end of the assembly process.

Preferably, the size of the pump used to fill the primary container is sufficient to complete filling of a 22,000 gallon container in less than 15 minutes, and preferably closer to 10 minutes.

As shown in FIG. 2, as cold water is pumped into the primary container, such that the level of water within the container, indicated by the dashed line 36, rises in the direction of the broken arrows 38, the container begins to sink into the containment shell, in the direction of the solid arrows 40, displacing the hot water from the containment shell. In order to enable the primary container 10 to sink into the containment shell in this manner, the strap securing the primary container relative to the boom is loosened and support of the primary container from above is relieved.

Continued filling of the primary container with cold water causes the container to slide further into the containment shell as hot water from the shell is forced between the container and the shell and from the container, as indicated by the broken arrows 42. Eventually, the weight of the primary container 10 and cold water therein is sufficient to force the primary container completely against the bottom wall 28 of the containment shell 12, as shown in FIG. 3. At this point, the delivery of cold water to the primary container is stopped, and the assembly is allowed to sit for a period of time, preferably one to two hours, while the temperature of the containment shell and primary container equalizes.

As the containment shell and primary container reach the same temperature, the primary container expands toward its original shape and the containment shell contracts. When this change in size of the containment shell and primary container occurs, two advantageous results are achieved.

Initially, because of the inward radial force exerted on the primary container by the tight fit between the container and the containment shell, the bottom wall of the primary container is biased toward a domed position, and moves to this position whenever the tank is emptied. In this manner, liquid within the tank is directed toward the outer edge of the primary container and may easily be completely emptied from the container, either through an outlet fitting formed on the primary container and extending through the containment shell, or through a hose extending through the top of the primary container and resting on the bottom wall thereof.

As mentioned, the corner between the bottom wall and side wall of the containment shell and primary container is radiused. This permits relative sliding movement between the corner of the primary container and the corner of the containment shell in order to enable the bottom wall of the primary container to move freely to the domed position, when possible. This domed position is illustrated in FIG. 4. A sharp corner would not permit this relative movement, while a corner having too large a radius would not provide reliable stand-alone support for the weight of the liquid stored in the tank. Therefore, some experimentation is required to find the optimum radius for any particular tank size and shape.

A second advantage obtained by constructing a double-walled tank in accordance with this method resides in the resulting prestressing mechanical force or pressure exerted in an inward radial direction on the primary container by the containment shell. This force opposes the outward pressure of liquid stored in the primary container, and thus reduces the overall stress seen by the primary container during use.

As mentioned, environmental stress fractures in conventional containers are caused as a result of chemical attack on the walls of a container being mechanically loaded by the pressure of the liquid stored therein. Because the mechanical stress on the primary container of the double walled tank is relieved by the inward radial pressure exerted by the containment shell, the adverse effects of contact between the inner surface of the primary container and the stored liquid are significantly reduced, extending the useful life of the tank. In other words, the containment shell bears the bulk of the mechanical load of the tank, while the primary container prevents physical contact between the chemical being stored and the containment shell. Thus, the two contributing factors to environmental stress fracture are isolated from one another to prevent such fractures from occurring.

Once the primary container is properly fitted within the shell, the top wall is assembled on the side wall of the shell through the use of the vapor-tight seal which seals the shell and prevents vapor from entering or exiting the shell. In addition, the space within the tank between the top wall of the container and the top wall of the shell is contained within the shell and is of a size sufficient to receive a pump or other hardware for use in filling and emptying the tank with liquid. Thus, a full containment system is obtained without the usual expense typically required.

A second construction of a double-walled container is illustrated in FIGS. 5 and 6, and includes a primary container 50 substantially identical to the primary container 10 illustrated in FIGS. 1-4. However, the container 50 preferably includes an outlet fitting in the side wall thereof for permitting liquids to be fed to and delivered from the container via suitable pumping hardware.

The containment shell 52 includes side and bottom walls 54, 56 of dimensions identical to the side and bottom walls of the primary container, but is provided with an open top end for which no top wall is provided. If desired, the side wall 54 may be shorter than the side wall of the primary container. When an outlet fitting is provided in the primary container, it is necessary to cut a hole in the containment shell in order to permit access to the fitting. Conventional means are employed to locate the fitting and to cut an aligned hole in the side wall of the containment shell upon completion of the assembly.

Thereafter, an adaptor may be threaded into the fitting. A hole is cut at the bottom of the side wall 54 of the containment shell to allow drainage of any liquid trapped between the containment shell and the primary container, such as rain water.

Although the invention has been described with reference to the preferred embodiment illustrated in the attached drawing figures, substitutions and equivalents may be employed herein without departing from the scope of the invention as recited in the claims. For example, although the tank is shown to include a flat bottom side, it is possible to practice the invention with a tank having a rounded or conical bottom end.

What is claimed is:

1. A method of constructing a double-walled tank comprising the steps of:

forming two cylindrical containers of substantially identical diameter, the containers including top, bottom, and side walls, wherein one of the containers defines a primary container and the other a containment shell;

removing the top of the containment shell;

filling the containment shell with hot water having a temperature of at least about 110° F. so that the containment shell expands temporarily increasing the diameter of the side wall of the containment shell;

positioning the primary container in alignment over the containment shell and lowering the primary container into contact with the hot water;

filling the primary container with cold water of a temperature at least about 70° F. less than the temperature of the hot water so that the primary container contracts temporarily decreasing the diameter of the side wall of the primary container, and allowing the primary container to sink to the bottom of the containment shell during continued filling of the primary container with cold water such that the primary container displaces the hot water in the containment shell; and removing the water from the primary container, wherein the containment shell and primary container return toward their original diameters such that the side wall of the containment shell exerts an inward radial force on the side wall of the primary container.

2. A method as recited in claim 1, wherein the temperature of the hot water filling the containment shell is lower than about 150° F.

3. A method as recited in claim 1, wherein the temperature of the hot water filling the containment shell is about 130° F.

4. A method as recited in claim 1, wherein the temperature of the cold water filling the primary container is about 50° F.

5. A method as recited in claim 1, wherein the difference between the temperature of the hot water and the temperature of the cold water is less than about 90° F.

6. A method as recited in claim 1, wherein the difference between the temperature of the hot water and the temperature of the cold water is about 80° F.

7. A method as recited in claim 1, wherein the primary container is filled with cold water in less than about 15 minutes.

8. A method as recited in claim 1, further comprising the step of guiding the primary container into the containment shell as the primary container is lowered into contact with the hot water.

9. A method as recited in claim 1, further comprising the step of replacing the top wall of the containment shell, and sealing the containment shell to provide a vapor-tight seal between the top and side walls.

10. A method of constructing a double-walled tank comprising the steps of:

molding a primary container and a separate containment shell each having top and bottom walls, and a tubular side wall, the side walls of the primary container and containment shell being of the same diameter;

removing the top wall of the containment shell;

filling the containment shell with hot water having a temperature of at least about 110° F. so that the containment shell expands temporarily increasing the diameter of the side wall of the containment shell;

positioning the primary container in alignment over the containment shell and lowering the primary container into contact with the hot water;

filling the primary container with cold water of a temperature at least about 70° F. less than the temperature of the hot water so that the primary container contracts temporarily decreasing the diameter of the side wall of the primary container, and allowing the primary container to sink to the bottom of the containment shell during continued filling of the primary container with cold water such that the primary container displaces the hot water in the containment shell;

removing the water from the primary container, wherein the containment shell and primary container return toward their original diameters such that the side wall of the containment shell exerts an inward radial force on the side wall of the primary container; and closing off the containment shell to prevent fluids outside the double-walled container from entering between the containment shell and the primary container.

11. A method as recited in claim 10, wherein the temperature of the hot water filling the containment shell is lower than about 150° F.

12. A method as recited in claim 10, wherein the temperature of the hot water filling the containment shell is about 130° F.

13. A method as recited in claim 10, wherein the temperature of the cold water filling the primary container is about 50° F.

14. A method as recited in claim 10, wherein the difference between the temperature of the hot water and the temperature of the cold water is less than about 90° F.

15. A method as recited in claim 10, wherein the difference between the temperature of the hot water and the temperature of the cold water is about 80° F.

16. A method as recited in claim 10, wherein the primary container is filled with cold water in less than about 15 minutes.

17. A method as recited in claim 10, further comprising the step of guiding the primary container into the containment shell as the primary container is lowered into contact with the hot water.

18. A method as recited in claim 15, wherein the closing off step includes the steps of replacing the top wall of the containment shell, and sealing the containment shell to provide a vapor-tight seal between the top and side walls of the shell.

* * * * *